United States Patent
Xiong et al.

(10) Patent No.: US 10,788,334 B2
(45) Date of Patent: Sep. 29, 2020

(54) OMNI WHEEL MILEAGE CALIBRATION METHOD, APPARATUS AND ROBOT USING THE SAME

(71) Applicant: UBTECH Robotics Corp, Shenzhen (CN)

(72) Inventors: Youjun Xiong, Shenzhen (CN); Xiangbin Huang, Shenzhen (CN)

(73) Assignee: UBTECH ROBOTICS CORP, Shenzhen (CN)

(*) Notice: Subject to any disclaimer, the term of this patent is extended or adjusted under 35 U.S.C. 154(b) by 189 days.

(21) Appl. No.: 16/195,868

(22) Filed: Nov. 20, 2018

(65) Prior Publication Data
US 2019/0195653 A1 Jun. 27, 2019

(30) Foreign Application Priority Data
Dec. 27, 2017 (CN) .......................... 2017 1 1468460

(51) Int. Cl.
*G01C 25/00* (2006.01)
*G07C 5/02* (2006.01)
*G05D 1/02* (2020.01)
*G06F 17/13* (2006.01)

(52) U.S. Cl.
CPC .......... *G01C 25/00* (2013.01); *G05D 1/0272* (2013.01); *G06F 17/13* (2013.01); *G07C 5/02* (2013.01)

(58) Field of Classification Search
CPC ...... G01C 25/00; G05D 1/0272; G06F 17/13; G07C 5/02
See application file for complete search history.

(56) References Cited

U.S. PATENT DOCUMENTS

| | | | | |
|---|---|---|---|---|
| 5,416,712 A * | 5/1995 | Geier | ................... | G01C 21/165 342/357.3 |
| 7,392,145 B1 * | 6/2008 | Romano | ................... | G01P 1/04 702/148 |
| 2006/0064240 A1 * | 3/2006 | Wurth | ................... | B60C 23/061 701/32.4 |
| 2009/0265054 A1 * | 10/2009 | Basnayake | ........... | B60W 40/114 701/31.4 |
| 2009/0290758 A1 * | 11/2009 | Ng-Thow-Hing | ...... | G06T 7/536 382/106 |
| 2017/0097229 A1 * | 4/2017 | Rogers | ................... | H04N 7/181 |
| 2018/0276910 A1 * | 9/2018 | Pitt | .......................... | G07C 5/08 |
| 2020/0116501 A1 * | 4/2020 | Wu | ....................... | G05D 1/0212 |
| 2020/0125862 A1 * | 4/2020 | Lee | ...................... | G05D 1/0231 |
| 2020/0159245 A1 * | 5/2020 | Raag | ................... | G05D 1/0251 |

* cited by examiner

*Primary Examiner* — Angelina Shudy

(57) ABSTRACT

The present disclosure provides an omni wheel mileage calibration method and apparatus, as well as a robot using the wane. The method includes: (a) calibrating the omni wheel through a linear motion to obtain a straight line calibration result; (b) calibrating the omni wheel through a rotational motion to obtain a rotation calibration result; (c) performing error verification to the straight line calibration result and the rotation calibration result along a preset movement trajectory having a loop to obtain an error verification result; (d) determining a straight line calibration corresponding to the straight line calibration result and a rotation calibration corresponding to the rotation calibration result being successful in response to the error verification result meeting a preset precision requirement. The present disclosure provides a mileage calibration method for an omni wheel system, which improves the operation precision of a robot.

20 Claims, 7 Drawing Sheets

US 10,788,334 B2

OMNI WHEEL MILEAGE CALIBRATION METHOD, APPARATUS AND ROBOT USING THE SAME

CROSS REFERENCE TO RELATED APPLICATIONS

This application claims priority to Chinese Patent Application No. 201711468460.7, filed Dec. 27, 2017, which is hereby incorporated by reference herein as if set forth in its entirety.

BACKGROUND

1. Technical Field

The present disclosure relates to robot technology, and particularly to an omni wheel mileage calibration method and apparatus, as well as a robot using the same.

2. Description of Related Art

The mileage calibration is a method for performing integral operation through a wheel encode and outputting the current estimated position of a wheeled robot in real time while navigating the wheeled robot. The accuracy of an odometer is affected by many factors manly including systematic errors and non-systematic errors. The system emirs include: wheel radius error, axis alignment error, wheel wheelbase error, encoder sampling rate, and the like. The non-systematic errors include: contact face factor, obstacle factor, wheel slipping event, and the like. At present, the two-wheel differential chassis mainly uses the UMBmark calibration method which is proposed by J. Borenstein and L. Feng in 1994 to analyze the systematic errors and the non-systematic errors of the two-wheel differential chassis. FIG. 1 is a schematic block of the structure of a two-wheel system in the UMBmark calibration method according to the prior art. As shown in FIG. 1, the center wheelbase of the two wheels is B, the diameter of the wheels is D, and a pair of motors are located at the inner side of the two wheels, and a chassis right hand coordinate system is established with the center of the chassis as the origin.

The system error of the differential chassis which is analyzed by the UMBmark calibration method has two types, that is, the proportional error of the left and right wheels and the wheelbase error between the two wheels. The UMBmark calibration method is to move for one circle along a preset square trajectory in a clockwise direction and a counterclockwise, respectively, so as to calculate a position difference between a starling point and an ending position of the robot, and then a proportional error factor of the left and right wheels and a wheelbase error factor between the wheels are calculated to calibrate the two-wheel differential chassis.

An omni wheel is a wheel with small discs around the circumference which are perpendicular to the turning direction. The effect is that the wheel can be driven with full force, but will also slide laterally with great ease. It is often used in intelligent robot research for small autonomous robots, and many robots use it to have the ability to move in all directions. In comparison with the conventional two-wheel structure, the structure of an omni wheel have a significant difference because the omni wheel can move in all directions, while the omni wheel has less elastic deformation when it contacts the ground, and the performance of a robot will be greatly improved when the robot adopts the omni wheel. However, at present, there is still no systematic calibration method specific to omni wheels.

BRIEF DESCRIPTION OF THE DRAWINGS

To describe the technical schemes in the embodiments of the present disclosure more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

DETAILED DESCRIPTION

The technical solutions in the present disclosure will be clearly and completely described below with reference to the accompanying drawings and embodiments. Apparently, the described embodiments are only a part of the embodiments of the present disclosure, rather than all embodiments. All other embodiments obtained based on the embodiments of the present disclosure by those skilled in the art without creative efforts are all fall within the scope of the present disclosure.

Figure 1:
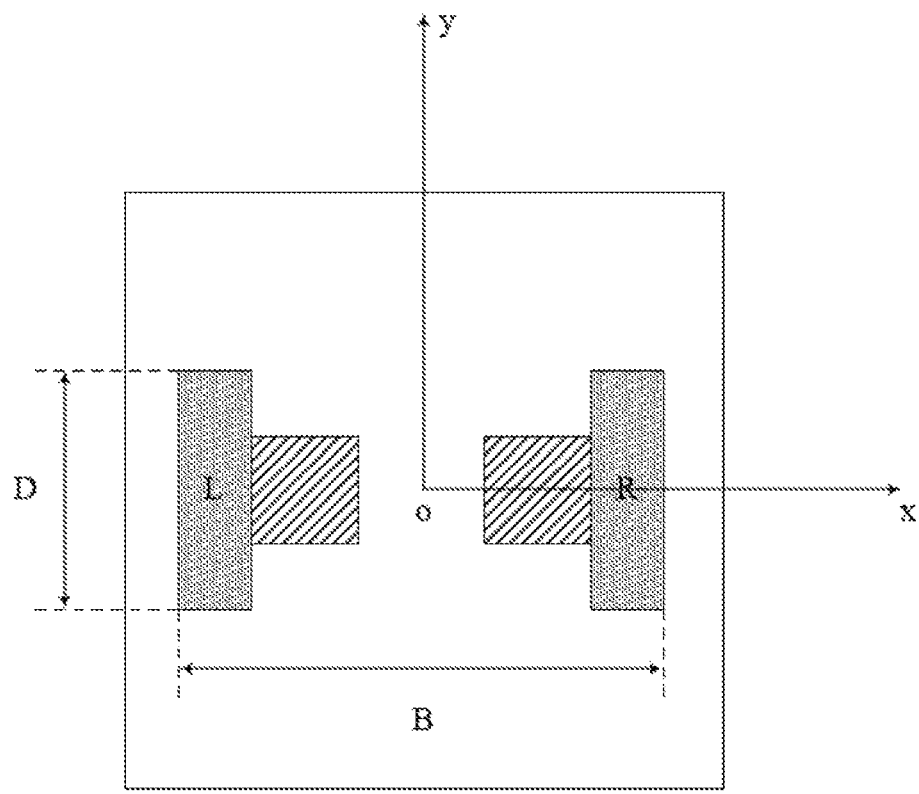
FIG. 1 is a schematic block of the structure of a two-wheel system in the UMBmark calibration method according to the prior art.
Figure 2:
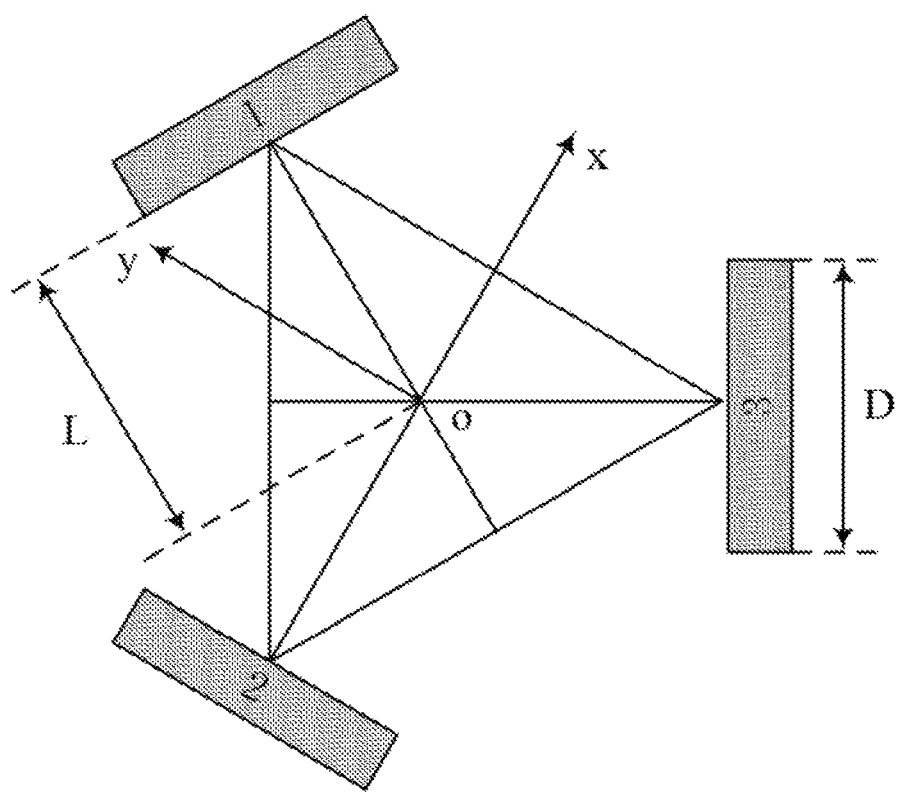
FIG. 2 is a schematic block of the structure of a three-wheel omni wheel in an omni wheel mileage calibration method according to an embodiment of the present disclosure.

FIG. 2 is a schematic block of the structure of a three-wheel omni wheel in an omni wheel mileage calibration method according to an embodiment of the present disclosure. In this embodiment, the three-wheel omni wheel is applied to a robot. As shown in FIG. 2, in the model structure, the omni wheel includes three wheels (all the wheels are the same), and the lines connecting the center points of the three wheels constitute an equilateral triangle. The center of the equilateral triangle is a center of the three wheels. The values to be calibrated include a diameter D of the wheels and a distance L between the wheel to the center of the three wheels, and a right hand rectangular coordinate system is established with the center of the three wheels as the origin. The calculation formula of the mileage of the omni wheel obtained through the established model is as follows:

$$\begin{bmatrix} \theta_i \\ Y_i \\ X_i \end{bmatrix} = \begin{bmatrix} \theta_{i-1} \\ Y_{i-1} \\ X_{i-1} \end{bmatrix} +$$

$$\frac{1}{3}\begin{bmatrix} \frac{1}{L} & \frac{1}{L} & \frac{1}{L} \\ \sqrt{3}\sin\theta_i + \cos\theta_i & -\sqrt{3}\sin\theta_i + \cos\theta_i & -2\cos\theta_i \\ \sqrt{3}\cos\theta_i - \sin\theta_i & -\sqrt{3}\cos\theta_i - \sin\theta_i & 2\sin\theta_i \end{bmatrix} \begin{bmatrix} \Delta U_{1,i} \\ \Delta U_{2,i} \\ \Delta U_{3,i} \end{bmatrix};$$

where, $\theta_i$ is the rotational angle of the omni wheel at time i, $X_i$ is the coordinate of the omni wheel in the x-axis direction at time i, $Y_i$ is the coordinate of the omni wheel in the y-axis direction at time i, $\theta_{i-1}$ is the rotational angle of the omni wheel at time i−1, $X_{i-1}$ is the coordinate of the omni wheel in the x-axis direction at time i−1, $Y_{i-1}$ is the coordinate of the omni wheel in the y-axis direction at time i−1, L is the distance from the three wheels of the omni wheel to the center of the three wheels, and $\Delta U_{1,i}$, $\Delta U_{2,i}$, $\Delta U_{3,i}$ respectively indicates the mileage of the three wheels from time i−1 to i, in which:

$\Delta U_{1,i} = C_m N_{1,i}$ $\Delta U_{2,i} = C_m N_{2,i}$;

$\Delta U_{3,i} = C_m N_{3,i}$ where, $N_{1,i}$, $N_{2,i}$, $N_{3,i}$ respectively indicates a rotation amount of the three wheels from time i−1 to i, and $C_m$ indicates a mileage factor of the three wheels:

$C_m = \pi D / n C_e$;

where, D is the diameter of the three wheels, n is a reduction ratio of a reducer for the omni wheel, and $C_c$ is a line amount of an encoder for the omni wheel. In which, the reducer and/or the encoder can be a portion (e.g., a component) of the three-wheel omni wheel, or a portion (e.g., a component) of the robot including the three-wheel omni wheel.

In other embodiments, the omni wheel may also be a multi-wheel system with more than three wheels which has a mileage calibration method similar to the mileage calibration method for the omni wheel with three wheels, which will not be described herein.

Figure 3:
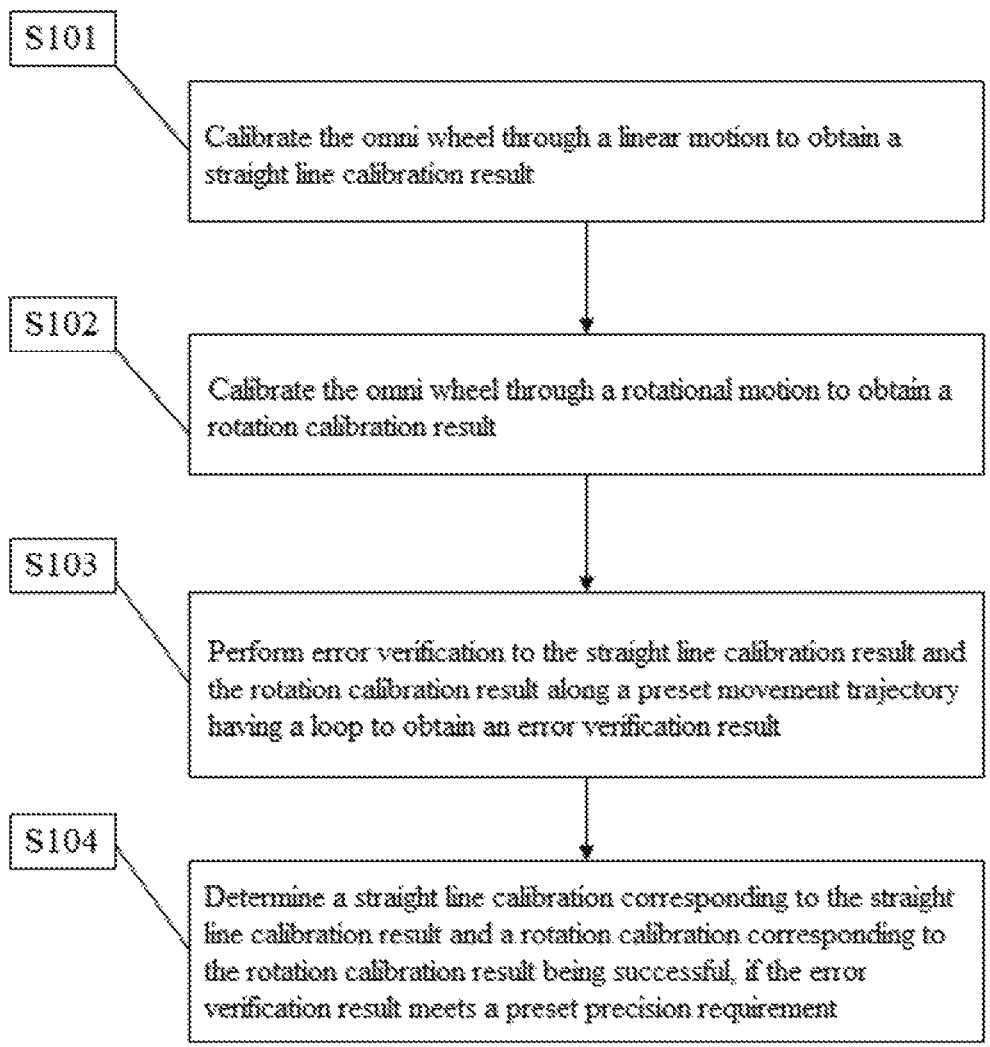
FIG. 3 is a flow chart of an embodiment of an omni wheel mileage calibration method according to the present disclosure.

FIG. 3 is a flow chart of an embodiment of an omni wheel mileage calibration method according to the present disclosure. In this embodiment, the omni wheel mileage calibration method is a computer-implemented method executable for a processor, which is applied to a robot including omni wheel(s) having three wheels as shown in FIG. 2. The omni wheel mileage calibration method may be implemented through an omni wheel mileage calibration apparatus, where the apparatus includes units each implementing one step of the method, and each of the units may be implemented in the form of hardware (e.g., a circuit), software (e.g., a program), or a combination thereof (e.g., a circuit with a single chip microcomputer). As shown in FIG. 3, the method includes the following steps.

S101: calibrating the omni wheel through a linear motion to obtain a straight line calibration result.

In this embodiment, an object of calibrating the omni wheel through the linear motion is a diameter of the three wheels of the omni wheel, that is, the diameter of three wheels is calibrated.

Figure 4:
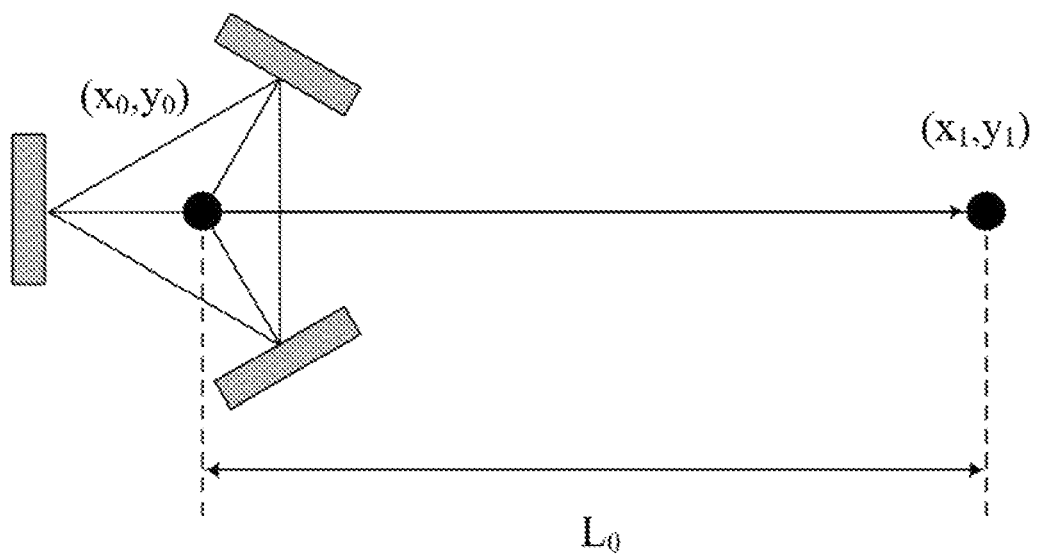
FIG. 4 is a flow chart of a linear calibration step of the omni wheel mileage calibration method according to the embodiment of the present disclosure.

FIG. 4 is a flow chart of a linear calibration step of the omni wheel mileage calibration method according to the embodiment of the present disclosure. As shown in FIG. 4, when the omni wheel is at an initial position, its rotational angle is $\theta=0$ and $\Sigma \Delta U_{1,i} = -\Sigma \Delta U_{2,i}$, thus the mileage of $L_0$ the omni wheel to move along a straight line can be calculated by the following formula:

$$L_0 = \sum \frac{2\sqrt{3}\Delta U_{1,i}}{3} = \frac{2\sqrt{3}\pi D}{3nC_e}\sum N_{1,i};$$

where, a starting coordinate $(x_0, y_0)$ and an ending coordinate $(x_1, y_1)$ of the center of the three wheels of the omni wheel are measured, and because the mileage $L_0$ of the omni wheel to move along the straight line is equal to the distance between the starting coordinate $(x_0, y_0)$ and the ending coordinate $(x_1, y_1)$, the expression (formula) for calibrating the diameter D of the wheels is as follows:

$$\sqrt{(x_1-x_0)^2 + (y_1-y_0)^2} = \frac{2\sqrt{3}\pi D}{3nC_e}\sum N_{1,i}.$$

In this embodiment, in the process of linear calibration, an average value can be obtained through multiple calibrations so as to make the value of the diameter D of the wheels more accurate.

S102: calibrating the omni wheel through a rotational motion to obtain a rotation calibration result.

In this embodiment, an object of calibrating the omni wheel through the rotational motion is the distance L from the three wheels to the center of the three wheels, that is, the distance L from the three wheels to the center of the three wheels is calibrated.

Figure 5:
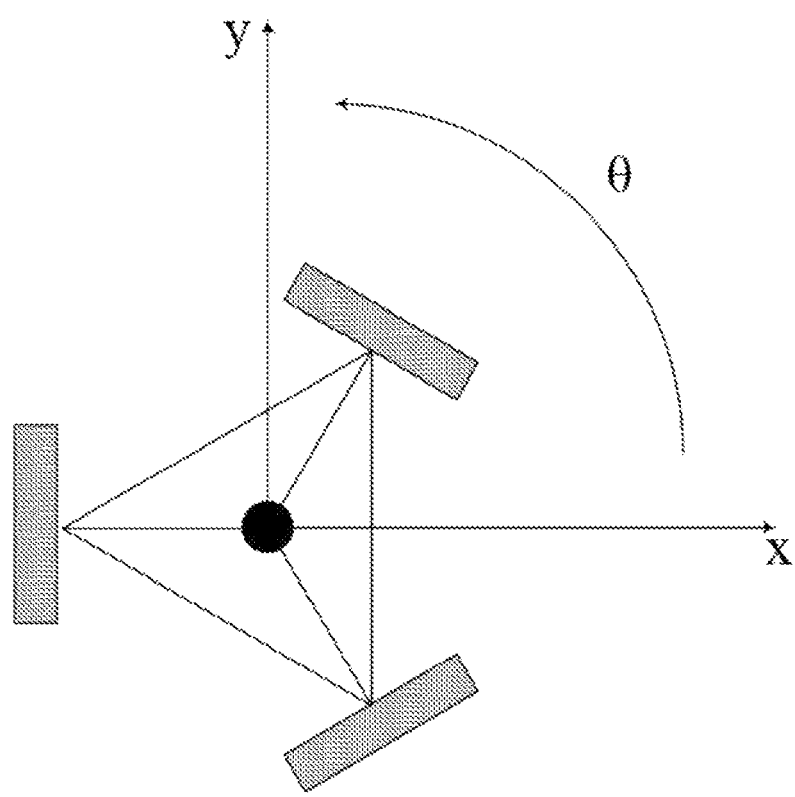
FIG. 5 is a flow chart of a rotational calibration step of the omni wheel mileage calibration method according to the embodiment of the present disclosure.

FIG. 5 is a flow chart of a rotational calibration step of the omni wheel mileage calibration method according to the embodiment of the present disclosure. As shown in FIG. 5, the omni wheel performs a rotational motion around the center point of the three wheels. In this case, there is only angular velocity while no linear velocity, the three wheels rotate at the same speed, and the mileage of the three wheels to move in a same period is equal, that is, $\Sigma \Delta U_{1,i} = \Sigma \Delta U_{2,i} = \Sigma \Delta U_{3,i}$.

An angle cumulative mileage θ of the three wheels after rotating for a period of time is measured, and the distance L from the wheels to the center of the three wheels is calibrated based on the following formula:

$$\theta = \frac{\sum \Delta U_{1,i} + \sum \Delta U_{2,i} + \sum \Delta U_{3,i}}{3L} = \frac{\sum \Delta U_{1,i}}{L} = \frac{\pi D/nC_e}{L}\sum N_{1,i}.$$

In this embodiment, in the process of rotational calibration, an average value can be obtained through multiple calibrations so as to make the value of the distance L of the wheels to the center of the three wheels more precise.

S103: performing error verification to the straight line calibration result and the rotation calibration result along a preset movement trajectory having a loop to obtain an error verification result.

Figure 6:
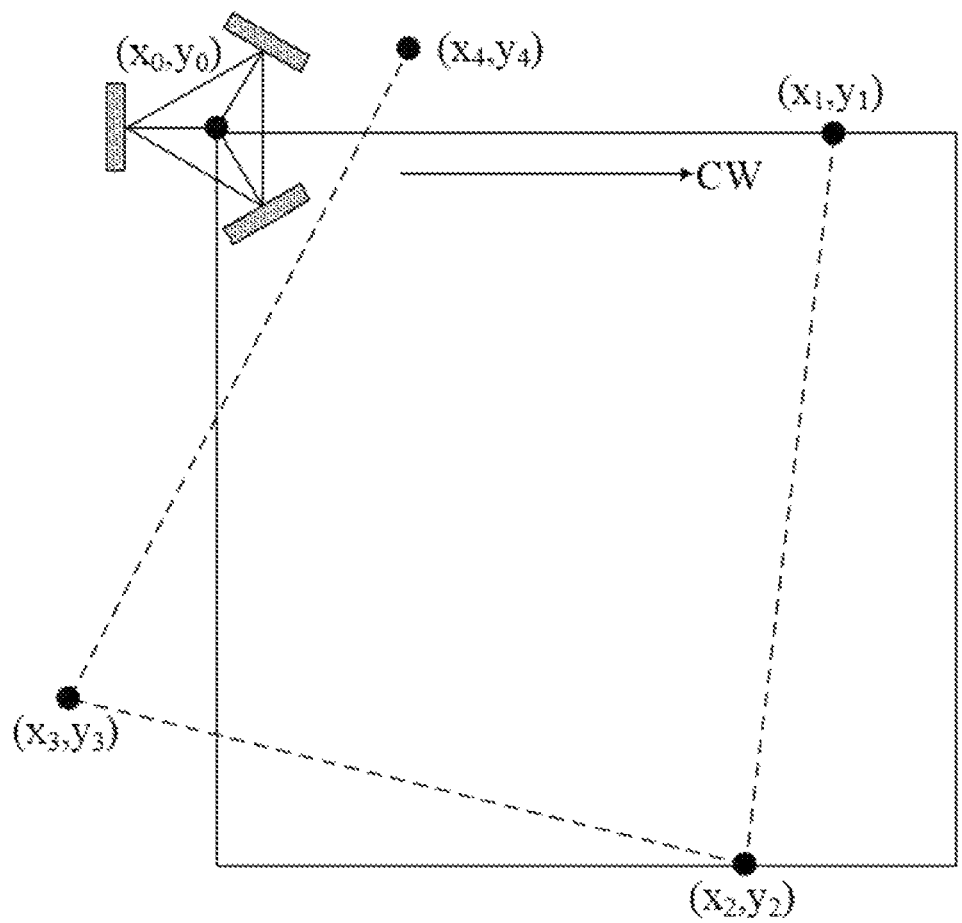
FIG. 6 is a flow chart of an error verification step of the omni wheel mileage calibration method when rotating in a clockwise direction according to the embodiment of the present disclosure.
Figure 7:
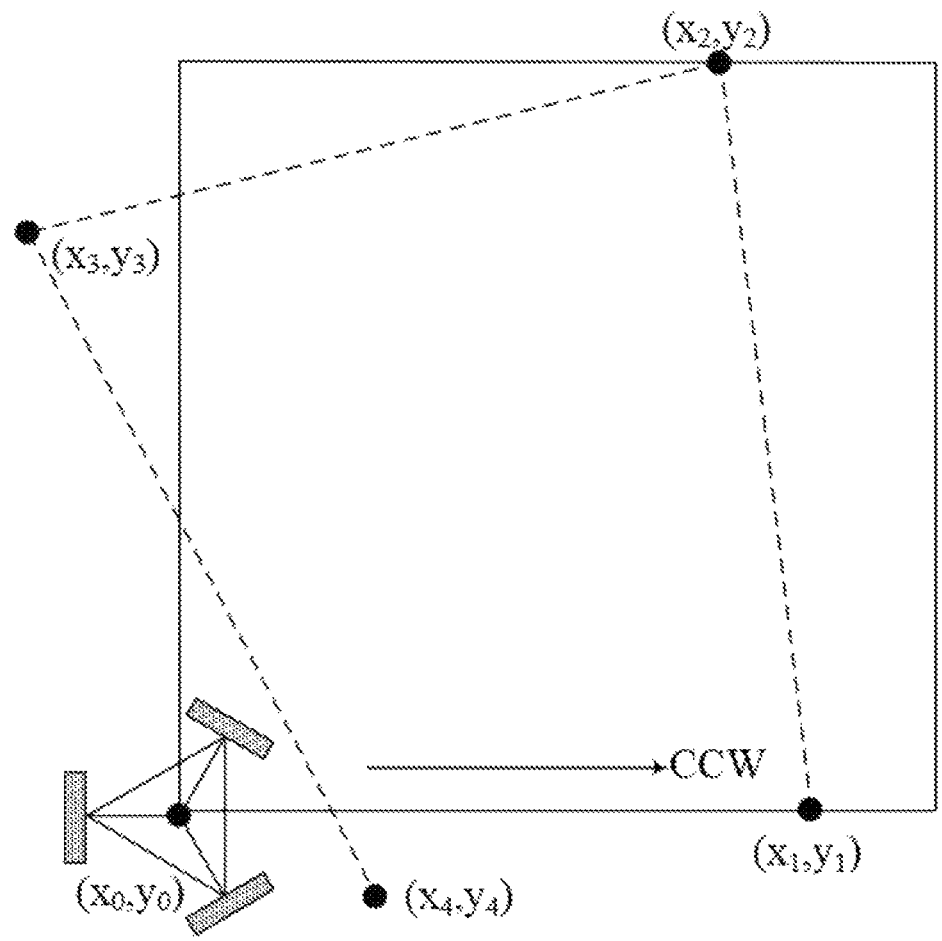
FIG. 7 is a flow chart of an error verification step of the omni wheel mileage calibration method when rotating in a counterclockwise direction according to the embodiment of the present disclosure.

FIG. 6 is a flow chart of an error verification step of the omni wheel mileage calibration method when rotating in a clockwise direction according to the embodiment of the present disclosure. FIG. 7 is a flow chart of an error verification step of the omni wheel mileage calibration method when rotating in a counterclockwise direction according to the embodiment of the present disclosure. As shown in FIG. 6 and FIG. 7, it is considered that one error verification step is performed after the omni wheel moves in a clockwise direction and a counterclockwise direction, respectively, along the preset movement trajectory having a loop for one circle, and the process is as follows.

As shown in FIG. 6, the starting position of the three wheels is at the coordinate $(x_0, y_0)$, the three wheels are moved (i.e., rotated) for one circle from the starting coordinate $(x_0, y_0)$ in a clockwise direction along a preset square movement trajectory for one circle, and finally reaching the ending coordinate $(x_4, y_4)$, that is, completing a clockwise moving process of the error verification, after passing through the coordinates $(x_1, y_1)$, $(x_2, y_2)$, and $(x_3, y_3)$ successively.

When the three wheels moves in the clockwise direction along the preset square movement trajectory, four movement processes including moving from the starting coordinate $(x_0, y_0)$ to the coordinate $(x_1, y_1)$, moving from the coordinate $(x_1, y_1)$ to the coordinate $(x_2, y_2)$, moving from the coordinate $(x_2, y_2)$ to the coordinate $(x_3, y_3)$, and moving from the coordinate $(x_3, y_3)$ to the ending coordinate $(x_4, y_4)$ are performed successively, where the four movement processes meet the following relationship:

$x_1 = x_0 + L_c$ $y_1 = y_0$ $x_3 = x_1 + L_c \sin \alpha$ $y_2 = y_1 + L_d \cos \alpha;$ $x_3 = x_2 - L_c \cos 2\alpha$ $y_3 = y_2 + L_d \sin 2\alpha$ $x_4 = x_3 - L_e \sin 3\alpha$ $y_4 = y_3 - L_c \cos 3\alpha$ where, $L_e$ indicates a length deviation and $\alpha$ indicates an angular deviation.

A relational equation between the starting coordinate $(x_0, y_0)$ and the ending coordinate $(x_4, y_4)$ as follows can be obtained by eliminating the intermediate parameters:

$x_4 = x_0 + L_c + L_e \sin \alpha - L_c \cos 2\alpha - L_e \sin 3\alpha;$ $y_4 = y_0 - L_d \cos \alpha - L_e \sin 2\alpha + L_e \cos 3\alpha$ since the angular deviation $\alpha$ is small enough, the above equation can be further simplified to obtain:

$x_4 = x_0 - 2L_e \alpha.$ $y_4 = y_0 + 2L_e \alpha$

By solving the equations, the length deviation $L_e$ and the angle deviation $\alpha$ when the three wheels moves in the clockwise direction along the preset square movement trajectory are obtained.

As shown in FIG. 7, the starting position of the three wheels is at the coordinate $(x_0, y_0)$, the three wheels are moved (i.e., rotated) for one circle from the starting coordinate $(x_0, y_0)$ in a counterclockwise direction along a preset square movement trajectory for one circle, and finally reaching the ending coordinate $(x_4, y_4)$, that is, completing a counterclockwise moving process of the error verification, after passing through the coordinates $(x_1, y_1)$, $(x_2, y_2)$, and $(x_3, y_3)$ successively.

When the three wheels moves in the counterclockwise direction along the preset square movement trajectory, four movement processes including moving from the starting coordinate $(x_0, y_0)$ to the coordinate $(x_1, y_1)$, moving from the coordinate $(x_1, y_1)$ to the coordinate $(x_2, y_2)$, moving from the coordinate $(x_2, y_2)$ to the coordinate $(x_3, y_3)$, and moving from the coordinate $(x_3, y_3)$ to the ending coordinate $(x_4, y_4)$ are performed successively, where the four movement processes meet the following relationship:

$x_1 = x_0 + L_e$ $y_1 = y_0$ $x_2 = x_1 + L_e \sin \alpha$ $y_2 = y_1 - L_e \cos \alpha;$ $x_3 = x_2 - L_e \cos 2\alpha$ $y_3 = y_2 - L_e \sin 2\alpha$ $x_4 = x_3 - L_e \sin 3\alpha$ $y_4 = y_3 + L_e \cos 3\alpha$ where, $L_e$ indicates a length deviation and $\alpha$ indicates an angular deviation.

A relational equation between the starting coordinate $(x_0, y_0)$ and the ending coordinate $(x_4, y_4)$ as follows can be obtained by eliminating the intermediate parameters:

$x_4 = x_0 + L_e + L_e \sin \alpha - L_e \cos 2\alpha - L_e \sin 3\alpha;$ $y_4 = y_0 - L_e \cos \alpha - L_e \sin 2\alpha + L_e \cos 3\alpha$ since the angular deviation $\alpha$ is small enough, the above equation can be further simplified to obtain:

$x_4 = x_0 - 2L_e \alpha.$ $y_4 = y_0 + 2L_e \alpha$

By solving the equations, the length deviation $L_e$ and the angle deviation $\alpha$ when the three wheels moves in the counterclockwise direction along the preset square movement trajectory are obtained.

In this embodiment, the adopted movement trajectory having a loop is a square trajectory. In other embodiments, the movement trajectory having a loop with other shapes can be adopted for error verification, and the length of the movement trajectory can also be changed according to actual demands, which is not descripted herein.

S104: determining a straight line calibration corresponding to the straight line calibration result and a rotation calibration corresponding to the rotation calibration result being successful, if the error verification result meets a preset precision requirement.

In summary, the length deviation $L_e$ and the angle deviation $\alpha$ are obtained by the two calculations in the error verification step S103 are compared with the preset precision requirement, where the preset precision requirement includes a length precision requirement value N and an angle precision requirement value M, and the values of N and M can be selected according to actual demands, which are not limited herein.

If the length deviation $L_e$ is less than or equal to the length precision requirement value N, and the angle deviation $\alpha$ is less than or equal to the angle precision requirement value M, that is, the length deviation $L_e$ and the angle deviation $\alpha$ meet the preset precision requirement, the linear calibration and the rotation calibration are determined to be successful.

If the length deviation $L_e$ is larger than the length precision requirement value N, or the angle deviation value α is larger than the angle precision requirement value M, that is, the obtained result does not meet the preset precision requirement, the linear calibration of step S101, the rotational calibration of step S102 of, and the error verification of step S103 are repeatedly executed until the preset precision requirement is met.

Different from the prior art, the present disclosure provides an omni wheel mileage calibration method, which solves the problem that there does not have a mileage calibration method specific to an omni wheel system in current robot technology, and improves the actual operation precision of the robot with the omni wheel system.

The present disclosure also provides a robot having an omni wheel system as shown in FIG. 2. The omni wheel system performs any of the above-mentioned omni wheel mileage calibration methods while in operation. The specific steps of the omni wheel mileage calibration method have been described in detail above, which are not described herein.

Different from the prior art, the present disclosure provides a robot with an omni wheel system, where the omni wheel system performs the above-mentioned omni wheel mileage calibration methods while in operation, which solves the problem that there does not have a mileage, calibration method for an omni wheel system in current robot technology, and improves the actual operation precision of the robot with the omni wheel system.

The forgoing is merely embodiments of the present disclosure, and is not for limiting the scope of the present disclosure while their descriptions are specific and detailed. It should be noted that, for those of ordinary skill in the art, the technical schemes in each of the above-mentioned embodiments may still be modified and improved, while these modifications or improvements do not make the essence of the corresponding technical schemes depart from the spirit and scope of the technical schemes of each of the embodiments of the present disclosure, and should be included within the scope of the present disclosure. Therefore, the scope of the present disclosure should be determined by the appended claims.

What is claimed is:

1. A computer-implemented calibration method for a mileage of an omni wheel of a robot, comprising executing on a processor the steps of:
    (a) calibrating the omni wheel through a linear motion to obtain a straight line calibration result;
    (b) calibrating the omni wheel through a rotational motion to obtain a rotation calibration result;
    (c) performing error verification to the straight line calibration result and the rotation calibration result along a preset movement trajectory having a loop to obtain an error verification result;
    (d) determining a straight line calibration corresponding to the straight line calibration result and a rotation calibration corresponding to the rotation calibration result being successful in response to the error verification result meeting a preset precision requirement;
    wherein, the omni wheel comprises three wheels, and an object of calibrating the omni wheel through the linear motion is a diameter of the three wheels of the omni wheel, and an object of calibrating the omni wheel through the rotational motion is a distance from the three wheels to the center of the three wheels, the movement trajectory is a square movement trajectory.

2. The method of claim 1, further comprising: repeating the steps (a), (b) and (c) until the preset precision requirement is met in response to the error verification result not meeting the preset precision requirement.

3. The method of claim 1, wherein the formula for calculating the mileage of the omni wheel is:

$$\begin{bmatrix} \theta_i \\ Y_i \\ X_i \end{bmatrix} = \begin{bmatrix} \theta_{i-1} \\ Y_{i-1} \\ X_{i-1} \end{bmatrix} +$$

$$\frac{1}{3} \begin{bmatrix} \frac{1}{L} & \frac{1}{L} & \frac{1}{L} \\ \sqrt{3}\sin\theta_i + \cos\theta_i & -\sqrt{3}\sin\theta_i + \cos\theta_i & -2\cos\theta_i \\ \sqrt{3}\cos\theta_i - \sin\theta_i & -\sqrt{3}\cos\theta_i - \sin\theta_i & 2\sin\theta_i \end{bmatrix} \begin{bmatrix} \Delta U_{1,i} \\ \Delta U_{2,i} \\ \Delta U_{3,i} \end{bmatrix}$$

where, $\theta_i$ is the rotational angle of the omni wheel at time i, $X_i$ is the coordinate of the omni wheel in the x-axis direction at time i, $Y_i$ is the coordinate of the omni wheel in the y-axis direction at time i, $\theta_{i-1}$ is the rotational angle of the omni wheel at time i−1, $X_{i-1}$ is the coordinate of the omni wheel in the x-axis direction at time i−1, $Y_{i-1}$ is the coordinate of the omni wheel in the y-axis direction at time i−1, L is the distance from the three wheels of the omni wheel to the center of the three wheels, and $\Delta U_{1,i}$, $\Delta U_{2,i}$, $\Delta U_{3,i}$ respectively indicates the mileage of the three wheels from time i−1 to i, wherein:

$\Delta U_{1,i} = C_m N_{1,i}$ $\Delta U_{2,i} = C_m N_{2,i}$;

$\Delta U_{3,i} = C_m N_{3,i}$ where, $N_{1,i}$, $N_{2,i}$, $N_{3,i}$ respectively indicates a rotation amount of the three wheels from time i−1 to i, and $C_m$ indicates a mileage factor of the three wheels:

$C_m = \pi D / n C_e$;

where, D is the diameter of the three wheels, n is a reduction ratio of a reducer, and $C_e$ is a line amount of an encoder.

4. The method of claim 3, wherein a rotational angle of the omni wheel at an initial position is θ=0 and $\Sigma\Delta U_{1,i} = -\Sigma\Delta U_{2,i}$, a mileage $L_0$ of the linear motion of the omni wheel is expressed as:

$$L_0 = \sum \frac{2\sqrt{3}\Delta U_{1,i}}{3} = \frac{2\sqrt{3}\pi D}{3nC_e} \sum N_{1,i};$$

wherein the step (a) comprises:
measuring a starting coordinate $(x_0, y_0)$ and an ending coordinate $(x_1, y_1)$ of the omni wheel; and
calibrating the diameter D of the three wheels based on the following formula:

$$\sqrt{(x_1 - x_0)^2 + (y_1 - y_0)^2} = \frac{2\sqrt{3}\pi D}{3nC_e} \sum N_{1,i}.$$

5. The method of claim 3, wherein the step (b) comprises:
measuring an angle cumulative mileage θ of the three wheels after rotating for a period of time; and calibrating the distance L from the three wheels of the omni wheel to the center of the three wheels based on the following formula:

$$\theta = \frac{\sum \Delta U_{1,i} + \sum \Delta U_{2,i} + \sum \Delta U_{3,i}}{3L} = \frac{\sum \Delta U_{1,i}}{L} = \frac{\pi D/nC_e}{L}\sum N_{1,i}.$$

6. The method of claim 3, wherein the step (c) comprises; moving the omni shed for one circle along a preset square trajectory in a clockwise direction and a counterclockwise, respectively, wherein a starting coordinate ($x_0$, $y_0$) and an ending coordinate ($x_4$, $y_4$) of the center of the three wheels are measured in each circle, and performing an error calculation on the three wheels based on the following formula and determining an precision of the calibration method:

$$x_4 = x_0 - 2L_e\alpha;$$

$$y_4 = y_0 + 2L_e\alpha$$

where, $L_e$ is a length deviation and $\alpha$ is an angular deviation.

7. The method of claim 1, wherein in the step (a), further comprising obtaining an average value through multiple calibrations.

8. The method of claim 1, wherein in the step (b), further comprising obtaining an average value through multiple calibrations.

9. A robot comprising:
at least an omni wheel having three wheels;
one or more processors;
a memory; and
one or more computer program stored in the memory and executable on the one or more processors, wherein the one or more computer programs comprise:
instructions for implementing step (a): calibrating the omni wheel through a linear motion to obtain a straight line calibration result;
instructions for implementing step (b): calibrating the omni wheel through a rotational motion to obtain a rotation calibration result;
instructions for implementing step (c): performing error verification to the straight line calibration result and the rotation calibration result along a preset movement trajectory having a loop to obtain an error verification result;
instructions for implementing step (d): determining a straight line calibration corresponding to the straight line calibration result and a rotation calibration corresponding to the rotation calibration result being successful response to the error verification result meeting a preset precision requirement;
wherein, an object of calibrating the omni wheel through the linear motion is a diameter of the three wheels of the omni wheel, and an object of calibrating the omni wheel through the rotational motion is a distance from the three wheels to the center of the three wheels, the movement trajectory is a square movement trajectory.

10. The robot of claim 9, the one or more computer programs further comprising:
instructions for repeating the steps (a), (b) and (c) until the preset precision requirement is met in response to the error verification result not meting the preset precision requirement.

11. The robot claim 10, wherein the formula for calculating the mileage of the omni wheel is:

$$\begin{bmatrix}\theta_i \\ Y_i \\ X_i\end{bmatrix} = \begin{bmatrix}\theta_{i-1} \\ Y_{i-1} \\ X_{i-1}\end{bmatrix} +$$

$$\frac{1}{3}\begin{bmatrix}\frac{1}{L} & \frac{1}{L} & \frac{1}{L} \\ \sqrt{3}\sin\theta_i + \cos\theta_i & -\sqrt{3}\sin\theta_i + \cos\theta_i & -2\cos\theta_i \\ \sqrt{3}\cos\theta_i - \sin\theta_i & -\sqrt{3}\cos\theta_i - \sin\theta_i & 2\sin\theta_i\end{bmatrix}\begin{bmatrix}\Delta U_{1,i} \\ \Delta U_{2,i} \\ \Delta U_{3,i}\end{bmatrix}$$

where, $\theta_i$ is the rotational angle of the omni wheel at time i, $X_i$ is the coordinate of the omni wheel in the x-axis direction at time i, $Y_i$ is the coordinate of the omni wheel in the y-axis direction at time i, $\theta_{i-1}$ is the rotational angle of the omni wheel at time i-1, $X_{i-1}$ is the coordinate of the omni wheel in the x-axis direction at time i-1, $Y_{i-1}$ is the coordinate of the omni wheel in the y-axis direction at time i-1, L is the distance from the three wheels of the omni wheel to the center of the three wheels, and $\Delta U_{1,i}$, $\Delta U_{2,i}$, $\Delta U_{3,i}$ respectively indicates the mileage of the three wheels from time i-1 to i, wherein:

$$\Delta U_{1,i} = C_m N_{1,i}$$

$$\Delta U_{2,i} = C_m N_{2,i};$$

$$\Delta U_{3,i} = C_m N_{3,i}$$

where, $N_{1,i}$, $N_{2,i}$, $N_{3,i}$ respectively indicates a rotation amount of the three wheels from time i-1 to i, and $C_m$ indicates a mileage factor of the three wheels:

$$C_m = \pi D/nC_e;$$

where, D is the diameter of the three wheels, n is a reduction ratio of a reducer, and $C_e$ is a line amount of an encoder.

12. The robot of claim 11, wherein a rotational angle of the omni wheel at an initial position is $\theta=0$ and $\Sigma\Delta U_{1,i}=-\Sigma\Delta U_{2,i}$, a mileage $L_0$ of the linear motion of the omni wheel is expressed as:

$$L_0 = \sum \frac{2\sqrt{3}\Delta U_{1,i}}{3} = \frac{2\sqrt{3}\pi D}{3nC_e}\sum N_{1,i};$$

wherein the instructions for implementing the step (a) comprises:
instructions for measuring a starting coordinate ($x_0$, $y_0$) and an ending coordinate ($x_1$, $y_1$) of the omni wheel; and
instructions for calibrating the diameter D of the three wheels based on the following formula:

$$\sqrt{(x_1-x_0)^2 + (y_1-y_0)^2} = \frac{2\sqrt{3}\pi D}{3nC_e}\sum N_{1,i}.$$

13. The robot of claim 11, wherein the instructions for implementing the step (b) comprises:
instructions for measuring an angle cumulative mileage $\theta$ of the three wheels after rotating for a period of time; and instructions for calibrating the distance L from the three wheels of the omni wheel to the center of the three wheels based on the following formula:

$$\theta = \frac{\sum \Delta U_{1,i} + \sum \Delta U_{2,i} + \sum \Delta U_{3,i}}{3L} = \frac{\sum \Delta U_{1,i}}{L} = \frac{\pi D/nC_e}{L} \sum N_{1,i}.$$

14. The robot of claim 11, wherein the instructions for implementing the step (c) comprises:
    instructions for moving the omni wheel for one circle along a preset square trajectory in a clockwise direction and a counterclockwise, respectively, wherein a starting coordinate $(x_0, y_0)$ and an ending coordinate $(x_4, y_4)$ of the center of the three wheels are measured in each circle, and
    instructions for performing an error calculation on the three wheels based on the following formula and determining an precision of the calibration method:

$$x_4 = x_0 - 2L_e\alpha;$$

$$y_4 = y_0 + 2L_e\alpha$$

where, $L_e$ is a length deviation, and $\alpha$ is an angular deviation.

15. The robot of claim 9, wherein the instructions for implementing the step (a) further comprises instructions for obtaining an average value through multiple calibrations.

16. The robot of claim 9, wherein the instructions for implementing the step (b) further comprises instructions for obtaining an average value through multiple calibrations.

17. A calibration apparatus for a mileage of an omni wheel of a robot, comprising:
    a first unit configured to calibrate the omni wheel through a linear motion to obtain a straight line calibration result;
    a second unit configured to calibrate the omni wheel through a rotational motion to obtain a rotation calibration result;
    a third unit configured to perform error verification to the straight line calibration result and the rotation calibration result along a preset movement trajectory having a loop to obtain an error verification result;
    a fourth unit configured to determine a straight line calibration corresponding to the straight line calibration result and a rotation calibration corresponding to the rotation calibration result being successful in response to the error verification result meeting a preset precision requirement;
    wherein, the omni wheel comprises three wheels, and an object of calibrating the omni wheel through the linear motion is a diameter of the three wheels of the omni wheel, and an object of calibrating the omni wheel through the rotational motion is a distance from the three wheels to the center of the three wheels, the movement trajectory is a square movement trajectory.

18. The apparatus of claim 17, further comprising a fifth unit configured to actuate the first unit, the second unit, the third unit, and the fourth unit until the preset precision requirement is met in response to the error verification result not meeting the preset precision requirement.

19. The apparatus of claim 17, wherein the formula for calculating the mileage of the omni wheel is:

$$\begin{bmatrix} \theta_i \\ Y_i \\ X_i \end{bmatrix} = \begin{bmatrix} \theta_{i-1} \\ Y_{i-1} \\ X_{i-1} \end{bmatrix} +$$

$$\frac{1}{3} \begin{bmatrix} \frac{1}{L} & \frac{1}{L} & \frac{1}{L} \\ \sqrt{3}\sin\theta_i + \cos\theta_i & -\sqrt{3}\sin\theta_i + \cos\theta_i & -2\cos\theta_i \\ \sqrt{3}\cos\theta_i - \sin\theta_i & -\sqrt{3}\cos\theta_i - \sin\theta_i & 2\sin\theta_i \end{bmatrix} \begin{bmatrix} \Delta U_{1,i} \\ \Delta U_{2,i} \\ \Delta U_{3,i} \end{bmatrix}$$

where, $\theta_i$ is the rotational angle of the omni wheel at time i, $X_i$ is the coordinate of the omni wheel in the x-axis direction at time i, $Y_i$ is the coordinate of the omni wheel in the y-axis direction at time i, $\theta_{i-1}$ is the rotational angle of the omni wheel at time i−1, $X_{i-1}$ is the coordinate of the omni wheel in the x-axis direction at time i−1, $Y_{i-1}$ is the coordinate of the omni wheel in the y-axis direction at time i−1, L is the distance from the three wheels of the omni wheel to the center of the three wheels, and $\Delta U_{1,i}$, $\Delta U_{2,i}$, $\Delta U_{3,i}$ respectively indicates the mileage of the three wheels from time i−1 to i, wherein:

$$\Delta U_{1,i} = C_m N_{1,i}$$

$$\Delta U_{2,i} = C_m N_{2,i};$$

$$\Delta U_{3,i} = C_m N_{3,i}$$

where, $N_{1,i}$, $N_{2,i}$, $N_{3,i}$ respectively indicates a rotation amount of the three wheels from time i−1 to i, and $C_m$ indicates a mileage factor of the three wheels:

$$C_m = \pi D/nC_e;$$

where, D is the diameter of the three wheels, n is a reduction ratio or a reducer, and $C_e$ is a line amount of an encoder.

20. The apparatus of claim 19, wherein a rotational angle of the omni wheel at an initial position is $\theta=0$ and $\Sigma \Delta U_{1,i} = -\Sigma \Delta U_{2,i}$, a mileage $L_e$ of the linear motion of the omni wheel is expressed as:

$$L_0 = \sum \frac{2\sqrt{3}\Delta U_{1,i}}{3} = \frac{2\sqrt{3}\pi D}{3nC_e} \sum N_{1,i};$$

wherein the first unit is configured to:
    measure a starting coordinate $(x_0, y_0)$ and an ending coordinate $(x_1, y_1)$ of the omni wheel; and
    calibrate the diameter D of the three wheels based on the following formula:

$$\sqrt{(x_1-x_0)^2 + (y_1-y_0)^2} = \frac{2\sqrt{3}\pi D}{3nC_e} \sum N_{1,i}.$$

* * * * *